United States Patent [19]

Buselli et al.

[11] 4,247,821

[45] Jan. 27, 1981

[54] TRANSIENT ELECTROMAGNETIC PROSPECTING APPARATUS POSSESSING NOISE SUPRESSION FEATURES

[75] Inventors: Gioachino Buselli, Hornsby Heights; Brian M. O'Neill, Ryde, both of Australia

[73] Assignee: Commonwealth Scientific and Industrial Research Organization, Canberra, Australia

[21] Appl. No.: 926,565

[22] Filed: Jul. 20, 1978

[51] Int. Cl.³ .............................................. G01V 3/10
[52] U.S. Cl. .................................................... 324/336
[58] Field of Search ................ 324/3, 6, 67, 239, 240, 324/336

[56] References Cited

U.S. PATENT DOCUMENTS

| | | | |
|---|---|---|---|
| 3,315,155 | 4/1967 | Colani | 324/6 X |
| 3,395,338 | 7/1968 | Barringer | 324/6 |
| 3,538,430 | 11/1970 | Bulgakov et al. | 324/6 |

FOREIGN PATENT DOCUMENTS 415022 12/1968 Australia .
351190 10/1972 U.S.S.R. ..................................... 324/6

*Primary Examiner*—Gerard R. Strecker
*Attorney, Agent, or Firm*—Fleit & Jacobson

[57] ABSTRACT

A transient electromagnetic signal transceiver for use in geophysical prospecting includes cultural noise and random noise reduction features. AC mains interference signals are minimized by synchronizing the reception of TEM signals with the mains frequency so that the mains interference components of alternate TEM signal measurements cancel. Other cultural noise is minimized by using low pass filters tuned to reject VLF radio signals. Common mode signal rejection, sferics suppression and signal stacking and averaging techniques improve the signal-to-noise ratio of the received TEM signals, while the use of a programmed microprocessor enables overall control of the transceiver to include the calculation and presentation of ground conductivity and other data.

14 Claims, 3 Drawing Figures

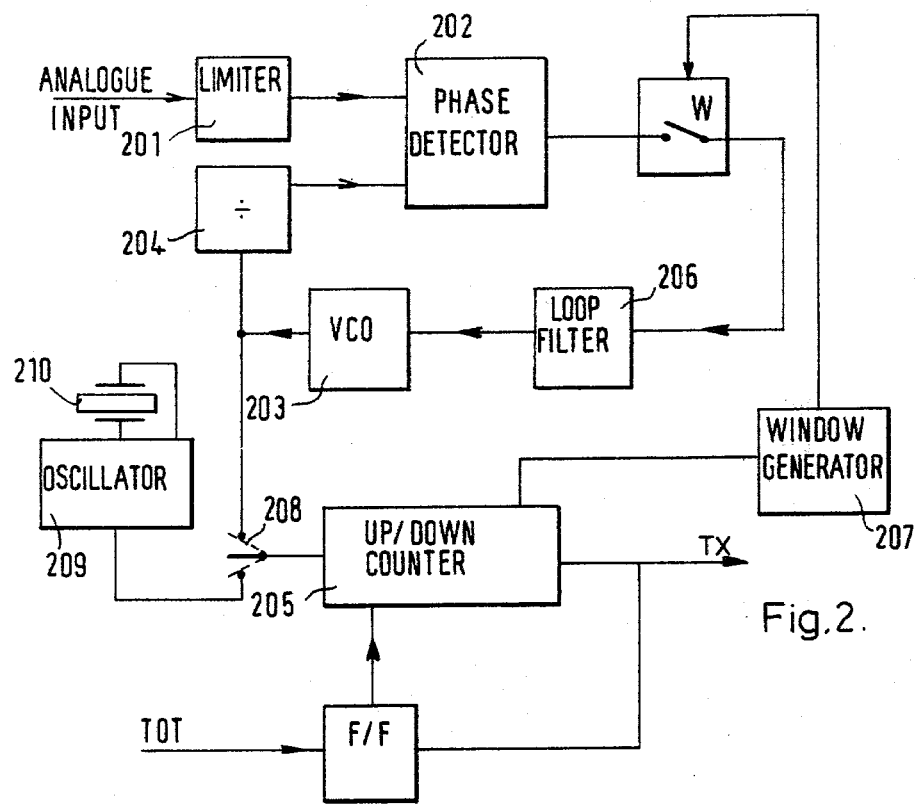
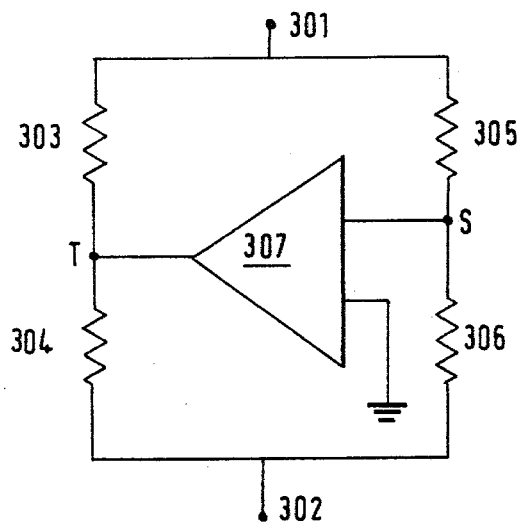
Fig.2.
Fig.3.

TRANSIENT ELECTROMAGNETIC PROSPECTING APPARATUS POSSESSING NOISE SUPRESSION FEATURES

This invention concerns instruments used in obtaining and analysing transient electromagnetic signals from buried conducting ore bodies. The transient electromagnetic (TEM) exploration technique is a well-established tool of the practising geophysicist. Commercial TEM instruments are produced by a number of manufacturers, one of the most common in Australia being the Russian-made unit known as the MPP01. That unit, based on the TEM instrument described in the specification of Australian Pat. No. 415,022 in the name of Vsesojuzny Nauchno-Issledovatelsky Institut Metodiki i Tekhniki Razvedki, in common with other TEM equipment currently available on the market, is known to have limited usefulness in Australia and in other parts of the world where conducting overburdens and significant cultural noise exist. While the former problem is not often experienced outside Australia, the latter condition is almost impossible to avoid with the global use of AC electric power and radio communication.

The problem of cultural noise can readily be appreciated by noting that the TEM measurement technique involves the sequential steps of:

(a) passing a DC current through a large conducting loop laid out on the surface of the earth, thereby establishing a magnetic field in the region underlying the loop, (b) removing the magnetic field by cutting off the DC current supply to the loop, and (c) observing the transient signals generated by eddy currents in any conducting ore-body located in the magnetic field when the field is collapsed.

In practice, the sequence is repeated periodically. The TEM signals observed in step (c) in Australia have an initial (maximum) value of about 25 microvolts, which rapidly decays to only a few microvolts. In contrast, the cultural noise level due to VLF radio signals alone, in the Australian environment, is commonly about 20 millivolts in the most remote areas.

The prime objective of the present invention is the production of a TEM instrument which has a superior performance in rejecting cultural noise as compared with existing equipment. A secondary objective, achieved in a modification of the improved TEM equipment of the present invention, is the provision of a facility for improving the signal-to-noise ratio, so that the equipment can be used even in those localities where the overburden is a conducting stratum.

To achieve the first of these objectives, the present invention provides a new circuit concept incorporated into TEM equipment to suppress mains interference, and to reject other noise. The mains interference suppression is achieved by arranging for the TEM signals to be derived at intervals so that the mains components of the signals received in consecutive TEM measurements are 180° out-of-phase and thus cancel out. The rejection of other cultural noise is achieved by the use of a low pass filter optimised for zero transient distortion while rejecting the strongest VLF radio signal carrier frequencies.

The additional features which provide a TEM instrument with improved signal-to-noise ratio, are a common mode signal rejection circuit, a sferics suppression arrangement, and a signal stacking and averaging arrangement controlled by a microprocessor.

Further (optional) additions are data analysis programs to provide the most appropriate printout and display facilities.

According to the present invention, a TEM signal transceiver comprises a DC signal transmitter which is connected to a field inducing loop and which is adapted to periodically generate a DC signal, and a receiver which includes means to detect an AC mains frequency interference signal and means to control the periodic operating frequency of the DC transmitter so that the disconnection of the DC signal supplied to the field inducing loop occurs at intervals such that the mains interference signal components of consecutive measurements are reversed relative to the TEM signal.

If the transmitter is a unipolar transmitter, the periodic operating frequency control means may be either a phase lock means or a crystal oscillator but the intervals between disconnections will be an odd number of half-cycles of the interference signal.

If the transmitter is a bipolar transmitter, the periodic operating frequency control means may again be either a phase lock means or a crystal oscillator, but the signal from the transmitter will be disconnected from the loop at intervals corresponding to an integral number of cycles of the mains interference signal.

Using these techniques, the consecutive signals received by the receiver of the TEM transceiver will include mains interference components which are reversed with respect to the last preceding interference signal, and which can be cancelled by averaging the TEM signals over an even number of measurements.

A further inventive feature which may be incorporated into a TEM signal transceiver of the present invention is a common mode signal rejection circuit comprising two pairs of series connected resistors, the pairs of resistors being connected in parallel across the receiver input terminals, the junction of one pair of resistors being connected to one input of a high gain differential amplifier, the other input of the differential amplifier being held at earth potential, the junction of the other pair of resistors being connected to the output terminal of the differential amplifier.

This arrangement, as will be shown later in this specification, effectively short circuits common-mode signals while providing a high impedance to the required (differential) signals.

Another inventive feature that may be included in the transceiver of the present invention is a signal averaging arrangement for the received TEM signals which comprises an integrator, a sample and hold circuit, an analogue to digital converter, a store, and an averaging circuit, the component circuits being so connected that when a first TEM signal is received, it is connected to the integrator, where it is integrated for a predetermined time, after which the integrated signal is held in a sample and hold circuit, then converted into a digital form, the digital form integrated signal being held in the store while the same action is taken with a plurality of subsequent TEM signals, after which the plurality of stored digital form signals are averaged.

If this feature is included in a transceiver which is used to measure TEM transients, the transceiver can be used to perform another aspect of the present invention, namely a method of obtaining an average TEM component signal value from n consecutively measured TEM signals, comprising the steps of:

(a) amplifying the first TEM signal;

(b) providing the amplified signal to an integrator after each of m predetermined delay times, measured from the time of collapse of the TEM magnetic field;

(c) integrating the amplified signal for a preset time;

(d) holding the integrated signal in a sample and hold circuit and then converting it to digital form;

(e) storing the m digital form signals so obtained;

(f) repeating steps (a) to (e) for each of the remaining (n−1) TEM signals; and (g) averaging the digital form signals for corresponding delay times in each of the n TEM measurement cycles.

If cultural noise in the TEM signals is to be suppressed, n is a positive and even number.

In a preferred form of TEM signal receiver, the averaging is carried out using a microprocessor which is programmed so that, after averaging the TEM transient components in each of the m time delays, the average value for the last delay time (when the TEM signal can be presumed to be zero) may, if a unipolar transmitter is used, be subtracted from all the other (m−1) averages obtained, thus effecting a zero correction of the average TEM signal components. The corrected averages may then be used for any required associated computation.

In practice, it is advantageous to average the signal components during several of the m time delays, particularly at long time delays, before recording the data for later use. Because the signal-to-noise ratio immediately after the TEM magnetic field has collapsed is different from the signal-to-noise ratio after a long delay time (say, 50 milliseconds), only a few values of the short time delay transient components need to be averaged to obtain a value comparable in error with that resulting from a large number of averages of the transient signal component after a long delay time.

As noted above, the cultural noise suppression feature of the present invention, may be assisted by the inclusion, in the TEM signal receiver, of a low pass filter which rejects the strongest VLF radio signal carrier frequencies.

In addition, the distortion of TEM signal measurements due to the occurrence of high level sferics (noise bursts) may be overcome by including a sferics detection circuit in the receiver which, when a sferic which exceeds a predetermined threshhold value is received, is effective to freeze the analogue-to-digital converter in the averaging circuit for the duration of the sferic. By this technique, the preceding corresponding value or values obtained from the analogue-to-digital converter are included in the averaging process, and the substantial distortion of the average TEM signal that could result from a high level sferic lasting for up to a millisecond can be eliminated.

The output from TEM signal receivers, constructed in accordance with the present invention, may be displayed, printed or stored, in any convenient manner, regardless of whether the output is series of average values, the electrical conductivity of the region under the loop, or any other data that may be derived.

A TEM transceiver incorporating the above features will now be described with reference to the accompanying drawings, in which:

FIG. 2 is a block diagram of a mains frequency filter and TEM field transmitter trigger circuit which incorporates both a phase lock filter arrangement and a crystal oscillator; and FIG. 3 illustrates the common-mode signal rejection arrangement used in the preferred form of TEM signal receiver.

Figure 1:
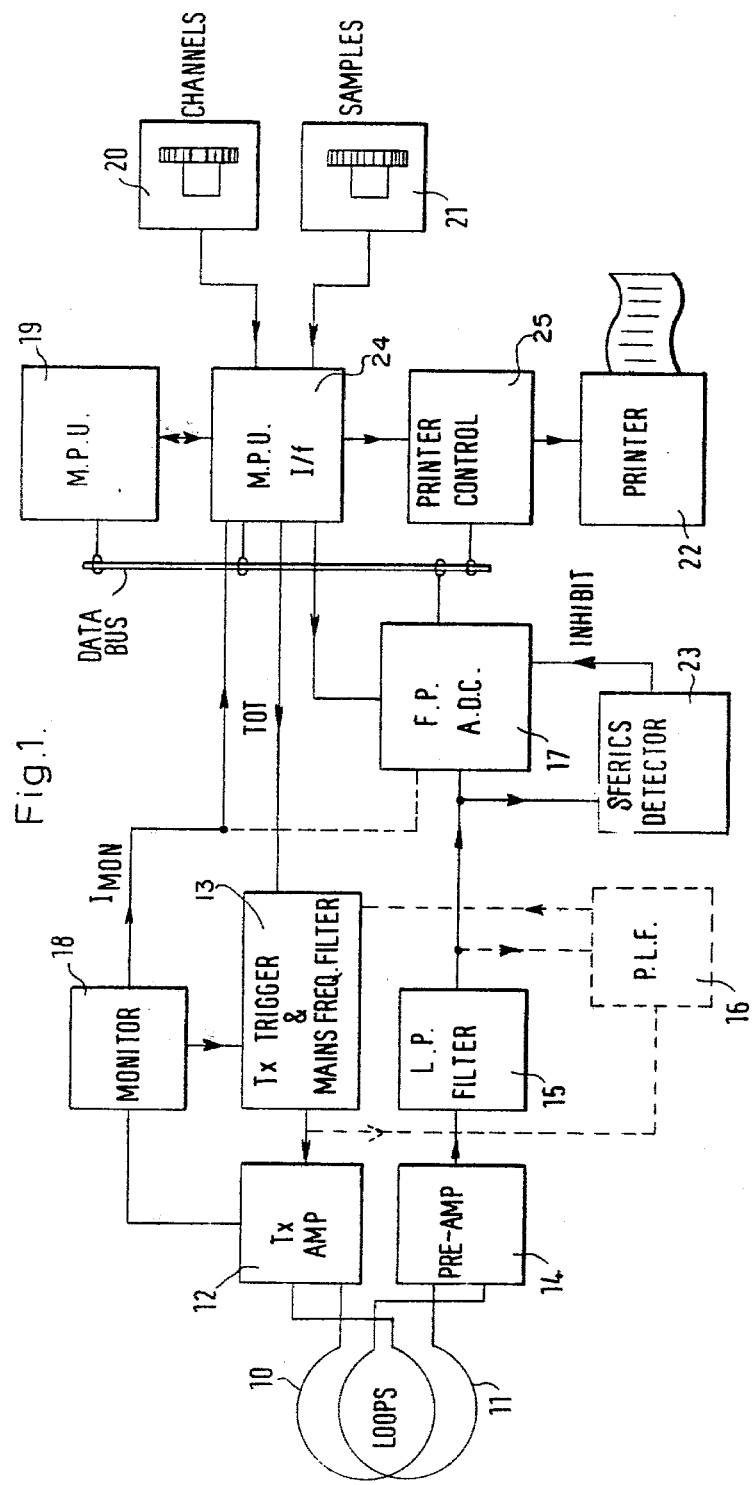
FIG. 1 is a block diagram of a TEM transceiver connected to transmitting and receiving loops.

The TEM instrument of FIG. 1 has the normal transmitter and receiver loops 10, 11 (respectively) which are electrically independent, although they may be physically the same loop of wire. All conventional loop configurations may be used, including coincident transmitter and receiver loops, separated transmitter and receiver loops, figure-eight loops (using dual concentric transmitter and receiver loops), and an arrangement comprising a large single-turn transmitter loop with a small multi-turn receiver loop.

Of these configurations (which not do constitute an exhaustive list of the alternatives available), the single loop common to transmitter and receiver is physically a practical arrangement when very large loops (greater than 200 m in diameter) requiring heavy conductors are required, but because of the presence of thermally generated e.m.f's, this configuration is rarely used when the TEM signal received is below about 1 microvolt per ampere of receiver signal. The large single-turn transmitter loop with small multi-turn receiver loop gives greater resolution, but requires long interconnecting leads and is more sensitive to geologic noise. Dual concentric transmitter and receiver loops offer a rapid layout situation, and this configuration is generally preferred except for steeply dipping geological structures, for which separated loops are preferable.

The signal to the transmitter loop may be supplied by any suitable unipolar or bipolar transmitter 12 which is controlled in its operation by trigger circuitry 13. The trigger circuit 13 generates trigger signals which are synchronised with any AC mains interference signal that may be present and picked up by the receiver loop 11. As already noted, provided the received TEM signal is averaged over an even number of cycles, the mains interference will be cancelled with this technique.

Two forms of trigger circuit 13 are included in the circuit illustrated in FIG. 2. Only one form is required in practice but, in a prototype TEM transceiver constructed by the present inventors, both forms were included and, using the circuit of FIG. 2, either could be selected.

The phase lock filter arrangement has a number of conventional phase lock circuit components but includes two hitherto unusual features—a voltage controlled oscillator operating at 4 times the mains frequency if a unipolar transmitter is used in the transceiver or at twice the mains frequency if a bipolar transmitter is used, and a 'window' arrangement operating while the transmitter is 'on' (and for the next quarter cycle of mains interference if a unipolar transmitter is used). The analogue input is a signal derived directly from the receiver loop 11. This signal is limited in amplitude by limiter 201, then is compared with a signal having the same frequency as the local mains (50 Hz in Australia but 60 Hz in some other countries) in phase detector 202, where any phase difference between the two signals is detected. The signal of the same frequency as the mains is derived from a voltage controlled oscillator 203 (which, as already mentioned, operates at a frequency four times—or twice, as the case may be—the mains frequency) using frequency divider 204. The output signal of the voltage controlled oscillator (VCO) 203 is also applied to an UP/DOWN counter 205, which counts up from zero until signalled by the microprocessor of the TEM equipment to 'turn on the transmitter' (by signal TOT) which causes the UP/DOWN counter 205 to reverse its direction of counting and generate a transmitter signal (TX) in synchronism with the VCO output. Since the VCO output is controlled by loop filter 206, operated by the output of phase detector 202, the VCO output, and hence signal TX, are synchronised with any mains interference. Once the UP/DOWN counter 205 has counted back to zero, it turns off transmitter (i.e., cancels signal TX) and resets the counting direction to 'up'. This sequence of operation of counter 205 ensures that the transmitter ON and OFF times are exactly equal, while allowing the microprocessor full control over the transmitter repetition frequency. The switch 208 of FIG. 2 enables either this form of frequency control to be selected, or control based on an oscillator 209 controlled by crystal 210 to be used.

The UP/DOWN counter 205 also provides a signal which actuates a window generator 207 which closes window W for the appropriate time. This ensures that the loop (202, 206, 203, 204) is closed for an integral number of half cycles of any mains interference, so that the VCO 203 is phase locked to the mains interference.

In switching the current to loop 10 on and off, low leakage transistors are used with base/emitter clamping to reduce the 'off' condition current to below 1 microampere. This allows the use of either common or separate transmitter/receiver loops. (The 'on' current in the case of the transmitter used in the prototype equipment constructed by the present inventors was 10 amps.)

After a current through the transmitter loop 10 has been established and switched off, the receiver loop 11 becomes effective. The signal from the receiver loop is supplied to a pre-amplifier 14 through the common mode signal suppression arrangement illustrated in FIG. 3. The receiver loop 11 is connected to terminals 301 and 302. Two series-connected pairs of resistors comprising, respectively, resistors 303 and 304 and resistors 305 and 306, are connected in parallel across terminals 301 and 302. Terminals 301 and 302 are also connected to the input terminals of the pre-amplifier 14. The junction S of resistors 305 and 306 is connected to one input of a high gain differential amplifier 307. The other input to amplifier 307 is earthed. The output of amplifier 307 is connected to the junction T of resistors 303 and 304. Any common-mode signal received at terminals 301 and 302 which causes the voltage at S to increase is inverted by amplifier 307, and T is pulled down by a factor of the gain of amplifier 307. This has the effect of presenting a very low impedance (about 2 ohms in practice) to common-mode signals—i.e., shorting them out—while differential signals are presented with high impedance (typically about 3 kilohms). The common-mode rejection ratio (CMRR) required of the pre-amplifier 14 can thus be reduced from a value of at least 140 dB in the absence of the suppression arrangement illustrated in FIG. 3, to a value of around 30 dB.

The pre-amplifier 14 can be any appropriate amplification arrangement. In practice, a pre-amplifier operating over a wide dynamic range of up to 500 millivolts at the input and with a gain of 14 dB has been successfully used.

The output from the pre-amplifier 14 is fed into a low pass filter 15. In the prototype unit, the low pass filter 15 was an 8 pole, 6 zero low pass filter with a cutoff frequency of around 5 KHz. It had been optimised for minimum transient distortion with the zeros set at 16 KHz, 22.4 KHz and 44 KHz, which are currently the strongest VLF radio signals in the Australian environment. This filter had a rise time of around 200 microseconds and a delay of around 250 microseconds.

The output from the low pass filter 15 is connected to both the mains filter/transmitter trigger circuit 13 and the analogue to digital converter 17 (the former connection being optionally via a separate phase lock filter 16).

The analogue to digital converter (ADC) 17 designed for the prototype TEM equipment required 400 microseconds to effect a conversion. Wider reception channels can be obtained by summing the appropriate number of 400 microsecond segments. Monitor 18 supplies a reference voltage $I_{MON}$ which is used to ensure that the digital output is proportional to receiver voltage per ampere of transmitter current.

For convenience in preparing FIG. 1, the ranging and integration circuits referred to above have been included within a floating point analogue-to-digital converter (FPADC) unit 17. A given time for ranging (e.g., 50 microseconds) and a given time for integration (e.g., 350 microseconds) make up the 400 microseconds (mentioned above) required to effect a conversion. As also mentioned above, the TEM signal transceiver is provided with a signal averaging arrangement which comprises the integrator, a sample and hold circuit, the analogue-to-digital converter, a store, and an averaging circuit, the component circuits being so connected that, when a first TEM signal is received, it is provided to the integrator wherein it is integrated for a predetermined time (the 350 milliseconds mentioned above), after which the integrated signal is held in a sample and hold circuit, then converted to digital form, the digital form integrated signal being held in the store while the same action is taken with a plurality of subsequent TEM signals, after which the plurality of stored digital form signals are averaged. Ranging is effected by sequentially switching the input signal to the integrator through a series of $\times 2$ amplifiers until the thus amplified input signal reaches a level which exceeds one-third of the voltage of a current monitor 18 incorporated into the TEM receiver, thus ensuring that all inputs to the integrator are at about the same level, notwithstanding the fact that the signals from low pass filter 15 provided to the FPADC unit 17 vary considerably over a wide range. The digital output signal of unit 17 is subsequently corrected to an absolute value in accordance with the number of $\times 2$ amplification steps required during the ranging operation. The microprocessor 19 is then 'flagged' that the data is ready and the data is read as two 12-bit words.

As already noted, the TEM transceiver preferably includes a means for detection of high level sferics which could render the measured TEM signals useless. Various sferics detection circuits could be used. The sferics suppression arrangement adopted by the present inventors included a detection circuit 23 (see FIG. 1) comprising an edge detector (a differentiator), the output of which is compared with a preset signal level in a comparator. If the edge detector output exceeds the preset level, the comparator causes an "inhibit" signal to be sent to the analogue to digital converter (ADC) 17 to suppress the updating function of the output register of the ADC. By this action, the microprocessor will read the data in the output register of the ADC which was obtained from the previous time window. Once the sferic signal drops below the preset signal threshold for the edge detector output, the ADC continues to function normally.

In the prototype receiver, the time of observation of a TEM transient was divided into 32 different time channels, corresponding to periods of from 400 microseconds to 25.6 milliseconds, at delay times of from zero to 164.6 milliseconds, as shown in Table 1. The microprocessor was programmed to average the signal values in each 350 microsecond interval observed, and also to provide averages of the TEM transient component in each time channel. Not all of the 32 channels had to be selected, however. Provision was made to select from 17 to 32 time channels for a TEM measurement.

While the microprocessor 19 may be of any suitable design that adds required signals and averages them, in the prototype equipment a CMOS microprocessor was used to reduce power consumption. With this type of microprocessor the power supply to the program memory is turned off except when it is being read, thus reducing the memory power consumption by an order of magnitude.

When the illustrated TEM equipment is operated, the 'initialise' button is actuated and the microprocessor resets and starts its program. This comprises the following steps:

(a) The thumb wheel switches 20 and 21 are read and their settings stored. (The thumb wheel switches are manually operable controls which set the operating conditions for the particular readings being taken. The switch 20, referenced 'channels', sets the latest time channel to be monitored, which, as already noted, could be any channel from 17 to 32 in the prototype equipment. This saves considerable time when late delay time signals are not required because monitoring all 32 channels available requires about 10 times the period necessary to average the signals of the first 17 channels alone, using the channel details of Table 1. The thumb wheel switch 21 sets the number of repetitions required for satisfactory averaging).

(b) The transmitter is turned on. The signal to turn on the transmitter (TOT) is sent to the transmitter trigger which turns on the transmitter when the phase of the mains interference is correct.

(c) Analogue to digital converter interrupt is selected. This is an input signal to the microprocessor to signal that data is ready. If ADC interrupt is not selected, data from the ADC is ignored.

(d) ADC interrupts are inhibited by the transmitter. When the transmitter turns off, ADC data is read into the microprocessor memory until the appropriate number of readings have been taken.

(e) The transmitter is turned on, as before. When the transmitter turns off (as already noted, the ON time is set equal to the OFF time by the circuitry illustrated in FIG. 2 and described above), ADC data is added to the previous data stored until the appropriate number of readings have been taken (of course, when a bipolar transmitter is used in the transceiver, the sign reversal of every second TEM signal must be compensated before the addition is made).

(f) Step (e) is repeated for the appropriate number of repetitions.

(g) If a unipolar transmitter is used in the transceiver, the last recorded channel is used as a zero correction by subtracting it from all other readings.

(h) The average signal values for each channel are computed.

(i) The binary data is converted to BCD.

(j) Printer interrupt is selected. This allows synchronisation with the integral printer.

(k) The channel number and data are printed.

(l) The microprocessor halts.

In the above sequence, operation of the microprocessor will result in actuation of printer control 25 to produce a print-out from printer 22 of a list of average TEM signal values in the different time channels after the loop 10 has been de-energised. Such a list can, of course, be printed as a graph.

In general, the microprocessor 19 will be programmed to convert the signal data into a form in which it provides most information to the exploration geophysicist. For example, in the prototype equipment, the conductivity of the region under the loop which is within the field established by the transmitter loop 10 was evaluated and the results of such analysis were displayed in addition to the TEM signal decay curve in the print-out from printer 22.

The interface between the microprocessor 19, control settings and printer control 25 is through microprocessor interface 24.

The prototype system, code-named "SIROTEM", was designed to be operated normally with a 22 volt, 10 ampere-hour portable nicad battery supply, but it could, if required, be operated using two 12-volt car batteries.

TABLE 1

| Channel No. | Nominal Mean Delay | Nominal Width | Actual Integration Window (ms) |
| --- | --- | --- | --- |
| 0 | 0.4 | 0.4 | 0.25–0.6 |
| 1 | 0.8 | 0.4 | 0.65–1.0 |
| 2 | 1.2 | 0.4 | 1.05–1.4 |
| 3 | 1.6 | 0.4 | 1.45–1.8 |
| 4 | 2.0 | 0.4 | 1.85–2.2 |
| 5 | 2.6 | 0.8 | 2.25–3.0 |
| 6 | 3.4 | 0.8 | 3.05–3.8 |
| 7 | 4.2 | 0.8 | 3.85–4.6 |
| 8 | 5.0 | 0.8 | 4.65–5.4 |
| 9 | 5.8 | 0.8 | 5.45–6.2 |
| 10 | 7.0 | 1.6 | 6.25–7.8 |
| 11 | 8.6 | 1.6 | 7.85–9.4 |
| 12 | 10.2 | 1.6 | 9.45–11.0 |
| 13 | 11.8 | 1.6 | 11.05–12.6 |
| 14 | 13.4 | 1.6 | 12.65–14.2 |
| 15 | 15.8 | 3.2 | 14.25–17.4 |
| 16 | 19.0 | 3.2 | 17.45–20.6 |
| 17 | 22.2 | 3.2 | 20.65–23.8 |
| 18 | 25.4 | 3.2 | 23.85–27.0 |
| 19 | 28.6 | 3.2 | 27.05–30.2 |
| 20 | 33.4 | 6.4 | 30.25–36.6 |
| 21 | 39.8 | 6.4 | 36.65–43.0 |
| 22 | 46.2 | 6.4 | 43.05–49.4 |
| 23 | 52.6 | 6.4 | 49.45–55.8 |
| 24 | 59.0 | 6.4 | 55.85–62.2 |
| 25 | 68.6 | 12.8 | 62.25–75.0 |
| 26 | 81.4 | 12.8 | 75.05–87.8 |
| 27 | 94.2 | 12.8 | 87.85–100.6 |
| 28 | 107.0 | 12.8 | 100.65–113.4 |
| 29 | 119.8 | 12.8 | 113.45–126.2 |
| 30 | 139.0 | 25.6 | 126.25–151.8 |
| 31 | 164.6 | 25.6 | 151.85–177.4 |

We claim:

1. A TEM signal transceiver comprising:

(a) a DC transmitter connected to a field inducing loop, said transmitter periodically connecting a direct current to said loop to establish a magnetic field in the vicinity thereof and disconnecting the direct current to induce a TEM signal in conducting material underlying said loop;

(b) a TEM signal receiver including means for detecting an AC mains frequency interference signal; and
(c) control means responsive to detection of said AC interference signal for controlling the operation of the DC transmitter to cause said disconnecting of the direct current to occur at intervals such that the mains frequency interference signal at any instant of said disconnection is 180° out of phase with the mains frequency interference signal at the last preceding said disconnection.

2. A TEM signal transceiver as defined in claim 1 wherein the transmitter is a unipolar transmitter and the said disconnection intervals are an odd number of half-cycles of the mains frequency interference signal.

3. A TEM signal transceiver as defined in claim 1 wherein the transmitter is a bipolar transmitter and the said disconnection intervals are an integral number of cycles of the mains frequency interference signal.

4. A TEM signal transceiver as defined in claim 1, wherein the control means comprises a phase lock circuit.

5. A TEM signal transceiver as defined in claim 1, wherein the control means includes a crystal oscillator.

6. A TEM signal transceiver as defined in claim 1, including a common mode signal rejection circuit comprising two pairs of series connected resistors, the pairs of resistors being connected in parallel across the input terminals of the receiver of the transceiver, the junction of one pair of resistors being connected to one input of a high gain differential amplifier, the other input of the differential amplifier being held at earth potential, the junction of the other pair of resistors being connected to the output terminal of the differential amplifier.

7. A TEM signal transceiver as defined in claim 6, including a signal averaging arrangement which comprises an integrator, a sample and hold circuit, an analogue to digital converter, a store and an averaging circuit, the component circuits being so connected that when a first TEM signal is received, it is connected to an integrator, where it is integrated for a predetermined time, after which the integrated signal is held in a sample and hold circuit, then converted into a digital form, the digital form integrated signal being held in the store while the same action is taken with a plurality of subsequent TEM signals, after which the plurality of stored digital form signals are averaged.

8. A TEM signal transceiver as defined in claim 4, in which the phase lock circuit includes a voltage controlled oscillator adapted to generate a signal at a frequency four times the frequency of the AC mains and means to generate from the output of the voltage controlled oscillator a reference signal having the same frequency as the AC mains.

9. A TEM signal transceiver as defined in claim 8, in which the output of the voltage controlled oscillator is applied to an UP/DOWN counter, said UP/DOWN counter being adapted to count UP until a signal from the phase lock circuit to turn on the DC signal generator is generated, and thereafter to count DOWN and simultaneously generate a signal in synchronism with the output of the voltage controlled oscillator until the counter has counted back to zero, whereupon the DC signal generator is turned off and the counting sequence begins again.

10. A TEM signal transceiver as defined in claim 7, in which the integrator includes
(a) a ranging circuit which sequentially switches the input signal to the integrator through a series of ×2 amplifiers until the thus amplified input signal reaches a level which exceeds one third of the voltage of a current monitor incorporated into the TEM receiver, thus ensuring all inputs to the integrator are at about the same level, and
(b) a correction circuit, to reduce the digital signal subsequently obtained from the amplified input signal to its absolute value.

11. A TEM signal transceiver as defined in claim 7, including a low pass filter optimised for minimum transient distortion and with zeros set at the frequencies of the strongest VLF radio signal or signals.

12. A TEM signal transceiver as defined in claim 11, including a sferics detection circuit which suppresses the updating of the output register of the analogue to digital converter in the presence of a sferic signal which exceeds a predetermined threshhold value.

13. A TEM signal transceiver as defined in claim 12, in which the sferics detection circuit comprises an edge detector, the output of which is supplied to a comparator for comparison with the predetermined threshhold value, said comparator causing an "inhibit" signal to be generated to effect the said suppression of the analogue to digital converter if the sferics signal exceeds the threshhold value.

14. A TEM signal transceiver as defined in claim 12, controlled by a microprocessor.

* * * * *